United States Patent [19]

Opitz

[11] Patent Number: 5,620,716
[45] Date of Patent: Apr. 15, 1997

[54] TIME STAMP FOR INSERTION INTO A MOULD FOR METAL WORKING OR PLASTICS PROCESSING

[75] Inventor: Heiko Opitz, Aschaffenburg, Germany

[73] Assignee: Opitz GmbH, Aschaffenburg, Germany

[21] Appl. No.: 432,690

[22] Filed: May 2, 1995

[30] Foreign Application Priority Data

May 3, 1994 [DE] Germany .......................... 44 15 583.2

[51] Int. Cl.⁶ ................................................. B29C 33/00
[52] U.S. Cl. .................. 425/169; 249/53 R; 249/103; 249/155; 425/193
[58] Field of Search ............................. 249/53 R, 53 M, 249/103, 104, 155; 425/169, 192 R, 193, 195

[56] References Cited

U.S. PATENT DOCUMENTS

| | | | |
|---|---|---|---|
| 2,813,300 | 11/1957 | Hausman | 425/192 |
| 3,674,394 | 7/1972 | Wiltshire | 425/195 |
| 4,137,962 | 2/1979 | Pol | 249/103 |
| 4,384,702 | 5/1983 | Boskovic | 425/195 |
| 4,708,314 | 11/1987 | Kuhling | 249/104 |
| 5,038,504 | 8/1991 | Modigh | 249/103 |

FOREIGN PATENT DOCUMENTS

| | | | |
|---|---|---|---|
| 1929875 | 6/1971 | Germany | 249/104 |
| 8526599 U | 1/1986 | Germany . | |
| 9314975 U | 2/1994 | Germany . | |

OTHER PUBLICATIONS

"Normalien–Technologie," *Plastverarbeiter*, vol. 44, No. 8, p. 126, 128, (1993).

*Primary Examiner*—C. Scott Bushey
*Attorney, Agent, or Firm*—Fitzpatrick, Cella, Harper & Scinto

[57] ABSTRACT

Time stamp for insertion into a mould for metal or plastics processing, with a basic body which can be inserted into the mould and in which an insert designed as a screw is arranged rotatably. The insert, in order to maintain its rotary position relative to the basic body, is retained in the basic body in that its shank end is in threaded engagement with a spring-pretensioned holding part arranged in the inner region of the basic body, so that the shoulder of the head portion of the insert can be pressed constantly against an annular radial step formed on the basic body.

14 Claims, 2 Drawing Sheets

TIME STAMP FOR INSERTION INTO A MOULD FOR METAL WORKING OR PLASTICS PROCESSING

FIELD OF THE INVENTION AND RELATED ART

This invention relates to a time stamp for insertion into a mould for metal working or plastics processing.

A known time stamp is disclosed in German Utility Model G 85 26 599.3. According to this time stamp shown in the assembled state in FIG. 3, a cylindrical basic body 1 is fastened in a bore 3 formed in a mould 2, in such a way that the front end face 4 of the basic body 1 is flush with a portion of the moulding surface 2a of the mould 2. That is to say, the front end face 4 confronts the interior of the mould. A continuous cylindrical recess 5 is formed in the basic body 1, with the result that a plane annular surface 6 is obtained on the basic body 1 on its end face confronting the interior of the mould. The annular surface 6 is provided with engraved markings, such as, for example, with a scale.

Arranged in the recess 5 is an insert 7 which is designed as a screw and which consists essentially of a cylindrical head portion 8 and of a cylindrical shank portion 10 provided with a thread 9. The shank portion 10 is designed with a smaller diameter than the head portion 8, so that a radial step is formed between the head portion 8 and shank portion 10. As a result, an annular axial bearing surface 11 is obtained on the insert 7. The insert has a front plane circular end face 15 which confronts the interior of the mould and which is provided with a slot 16, which provides a recess suitable for engagement of a tool, and with an engraved arrowhead 17, which, with the shown indicia, provides time information.

The recess 5 formed in the basic body 1 has a first bore portion 12 confronting the interior of the mould and with a diameter which is somewhat larger than the outside diameter of the head portion 8, so that the head portion 8 can be countersunk in the first bore portion 12 of the recess 5. The middle portion of the recess 5 has a threaded bore 13 with a smaller diameter than the diameter of the first bore portion 12, so that a radial step 14 is formed. The thread of the threaded bore 13 fits together with the thread 9 formed on the insert 7.

A helical compression spring 18 is provided between the annular axial bearing surface 11 of the insert 7 and the radial step 14 of the basic body 1. The compression spring 18 is accordingly accommodated in the first bore portion 12, so that it surrounds the shank portion 10.

When a known time stamp as described above is assembled, first of all the compression spring 18 is inserted into the first bore portion 12. The insert 7 is then inserted with its shank end into the cylindrical recess 5 and the thread 9 formed on the shank portion 10 is screwed together with the thread formed in the threaded bore 13, until the front end face 15 of the insert 7 is flush with the annular surface 6 of the basic body 1. At the same time, the spring 18 is compressed and exerts a frictional force between the insert 7 and the basic body 1, so that the insert 7 can be held in a specific preselected rotary position relative to the basic body 1.

An advantage of this arrangement is that the insert 7 has to be screwed into the basic body 1 solely from the inner region of the mould. That is to say, in order to change the insert 7, it is only necessary for the time stamp to be accessible from inside the mould.

A disadvantage of this arrangement, however, is that during the movement to set the insert 7, that is to say during the rotation of the insert 7 relative to the basic body 1, the height position of the insert 7 relative to the basic body 1 varies as a result of the thread pitch. Each rotary position of the insert 7 necessitates a different height position and therefore a different wall thickness on the moulding in the region of the end face 15 of the insert 7.

SUMMARY OF THE INVENTION

An object of the invention is therefore to develop a generic time stamp in such a way that, for different settings of the time stamp, the wall thicknesses of the mouldings produced in each case remain the same, whilst a simple exchange of the insert is to be maintained.

To achieve this object, a time stamp is provided which includes a basic body, an insert formed as a screw, and a holding device. The basic body has a moulding surface, a portion of which comprises an end face. The end face has a cylindrical recess therein, which has an axial bearing surface. The insert, which has a head portion and a shank portion, is rotatably inserted in the recess. An annular axial bearing surface is formed on the insert between the head portion and the shank portion thereof. The holding device, which is located in the recess and engages the insert, has a holding part which includes a pretensioned spring.

As a result of the axial bearing surface which is formed in the basic body and which serves as an abutment surface for the annular axial bearing surface formed on the insert, a uniform height setting is always guaranteed when the insert is adjusted relative to the basic body. The holding force necessary for maintaining a specific setting of the insert is exerted by the spring-pretensioned holding part accommodated in the cylindrical recess, in that the shank portion of the insert is in threaded connection with the holding part and the two bearing surfaces are pressed against one another by means of the spring pretension of the holding part, so that a frictional force is generated.

It is a further object of the present invention to provide a time stamp in which the holding part is designed as a rotationally fixed threaded nut which is axially movable in the recess. It is still another object of the present invention to provide a time stamp with the above-described features and in which the nut is axially movable between two abutments formed in the recess of the basic body, so that the spring pretension and consequently the holding force can be set in an advantageous way.

The invention is explained in more detail below by means of a preferred exemplary embodiment with reference to the drawings.

DETAILED DESCRIPTION OF THE PREFERRED EMBODIMENTS

Figure 2:
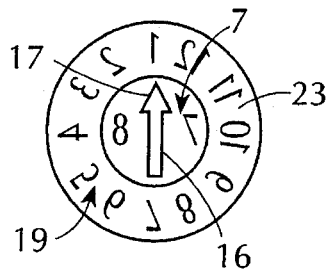
FIG. 2 shows a top view in the direction of the arrow of the time stamp illustrated in FIG. 1.
Figure 3:
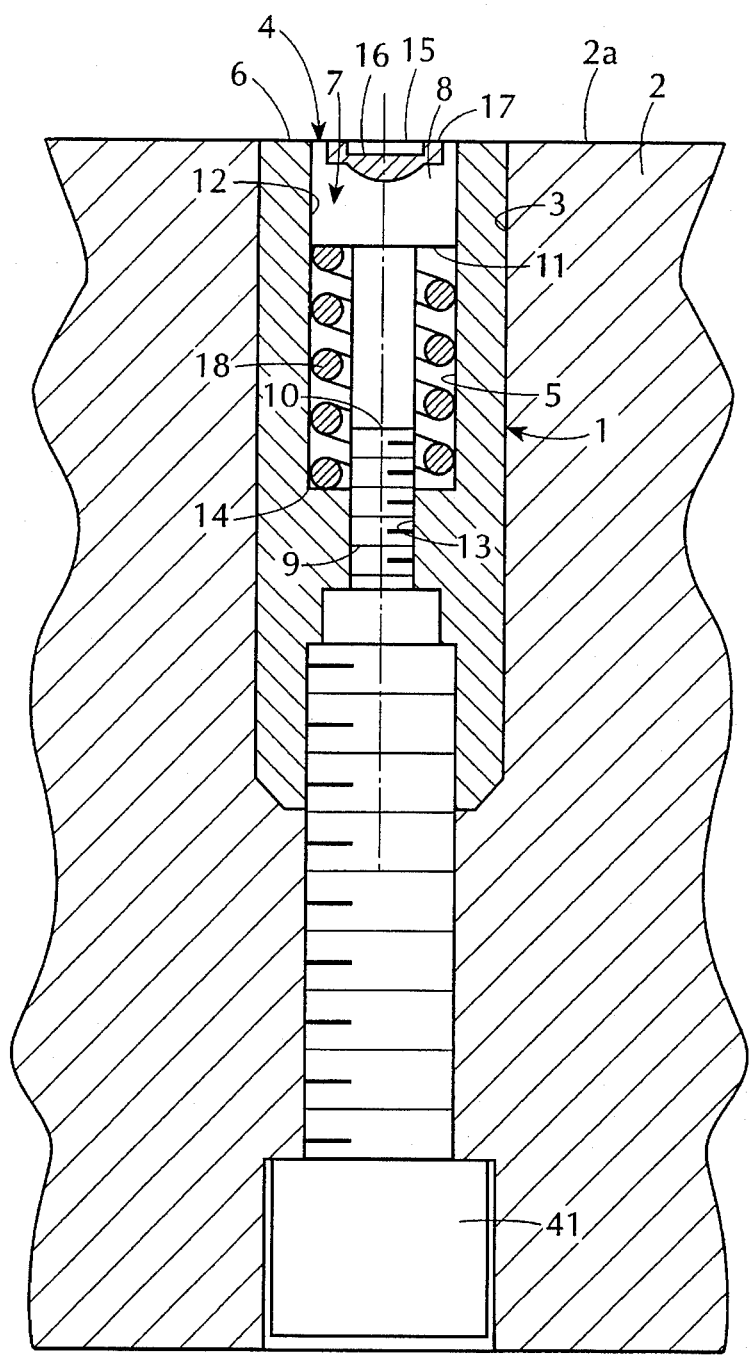
FIG. 3 shows a sectional view of a known time stamp, such as is disclosed in German Utility Model G 85 26 599.3.

The reference numerals used to describe components of the known time stamp shown in FIG. 3 are also used to refer to similar components in the enbodiment of the present invention described below and shown in FIGS. 1 and 2.

Figure 1:
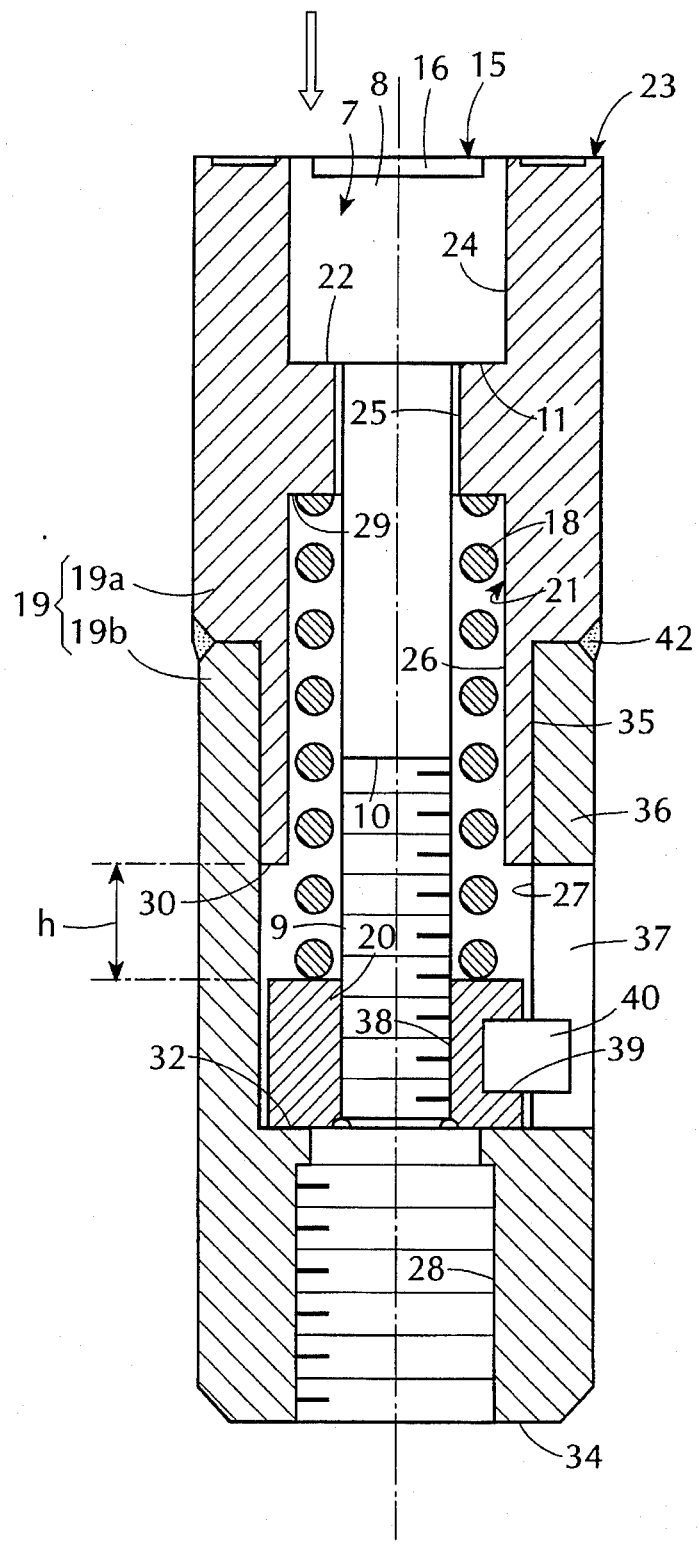
FIG. 1 shows a longitudinal sectional view of the time stamp according to the invention in the assembled state.

As shown in FIG. 1 and FIG. 2, a preferred embodiment of the present invention includes a basic body 19, a screw-like insert 7 and a holding part 20 pretensioned by means of a spring 18. The insert 7 of the exemplary embodiment according to the invention is identical to the insert 7 of the above-described known time stamp. This is advantageous, since the insert 7 can be used both in the known embodiment and in the embodiment according to the present invention.

Components of a preferred embodiment of the present invention are described in detail below, with reference to FIG. 1.

The basic body 19 of the exemplary embodiment according to the invention has a cylindrical recess 21. With the exception of the design of the cylindrical recess 21, the basic body 19 is identical to the basic body 1 described above and shown in FIG. 3. In the basic body 19 according to the invention too, therefore, the insert 7 is received rotatably by the cylindrical recess 21 in the assembled state. In the embodiment shown in FIG. 1, a radial step is formed in the cylindrical recess 21 in a middle portion. This radial step thus provides an axial bearing surface 22 which points towards the interior of the mould. In the assembled state, this axial bearing surface 22 serves as a depth abutment which butts against the axial bearing surface 11 formed on the head portion 8 of the insert 7. The holding part 20 is received fixedly in terms of rotation, but axially movably, in a middle portion of the cylindrical recess 21. The spring 18 is received in the cylindrical recess 21 in such a way that it exerts a pretension on the holding part 20. The holding part 20 is provided with a thread 38 which can be brought into engagement with the thread 9 of the insert 7 formed on the shank portion 10. The direction of the pretensioning force of the spring 18 is such that the axial bearing surface 11 of the insert 7 is pressed against the axial bearing surface 22 of the basic body 19. It is thus possible, in this arrangement, for the height position of the insert 7 relative to the basic body 19 or to the inner face 2a of the mould to be constant, whilst the insert 7 has to be screwed into the basic body 19 merely from inside the mould.

The outer contour of the basic body 19 is designed as a cylinder. As shown in FIG. 2, a front end face of the basic body 19 confronting the inner region of the mould is designed as a plane annular surface 23 which is provided with engravings and which forms part of the moulding inner face of the mould. The annular surface 23 is obtained as a result of the cylindrical recess 21 which is formed in the end face and which extends through the basic body 19 in the axial direction.

Starting from the annular surface 23 and proceeding towards the rear end face 34, the cylindrical recess 21 is composed of the following regions: a first cylindrical bore portion 24, a second narrowed cylindrical bore portion 25, third and fourth cylindrical bore portions 26 and 27 and a threaded bore 28. All the regions of the cylindrical recess 21 are arranged concentrically.

The diameter of the first bore portion 24 formed on the same side as the annular surface 23 and the depth extent of the first bore portion 24 from the annular surface 23 to the axial bearing surface 22 are selected so that the head portion 8 can be received exactly. The second bore portion 25 starts at the axial bearing surface 22 and extends as far as the start of the third bore portion 26. The diameter of the second bore portion 25 is smaller than the diameter of the first bore portion 24; however, it is selected to be large enough that the shank portion 10 can be guided through.

The diameter of the third bore portion 26 is made larger than the diameter of the second bore portion 25, so that a radial step 29 is formed at the transition of the two bore portions 25 and 26. The diameter of the third bore portion 26 corresponds approximately to the diameter of the first bore portion.

The diameter of the fourth bore portion 27 is larger than the diameter of the third bore portion 26, so that a radial step is formed at the transition of the two bore portions 26 and 27. This radial step provides an annular axial abutment surface 30.

The inside diameter of the threaded bore 28 is smaller than the inside diameter of the fourth bore portion 27, so that a further radial step is formed at this point, providing another annular axial abutment surface 32. The threaded bore 28 opens onto the rear end face 34 of the basic body 19.

As is also explained in more detail later, for assembly purposes the basic body 19 is subdivided in its middle portion into two parts, a front part 19a and a rear part 19b. On the front part 19a of the basic body 19, an annular recess 35 is formed in the region of the third bore portion on its outer wall. The outside diameter of the recess 35 is fixed so that the recess 35 fits into the fourth bore portion 27. The rear part 19b has formed in the region of the fourth bore portion 27 an annular lengthening portion 36 pointing in the axial direction towards the inside of the mould.

To assemble the two parts 19a and 19b, the lengthening portion 36 of the rear part 19b is pushed onto the recess 35 formed on the front part 19a, until the end face of the lengthening portion 36 butts against the annular step surface formed by the recess 35 on the front part 19a. A weld 42 is made at this butt joint to connect the front part 19a to the rear part 19b and can be designed, for example, as a laser-welding seam around the entire circumference of the basic body 19. However, the welding of the front part 19a and of the rear part 19b takes place only during a subsequent assembly step, as also described below.

A long hole 37 extending in the axial direction is formed in the outer wall of the basic body 19 in the region of the fourth bore portion 27.

The insert 7 shown in FIG. 1 has a cylindrical head portion 8 and cylindrical shank portion 10 with a threaded portion 9, as described above.

The holding part 20 is designed as a nut provided with an internal thread 38. The outer contour of the holding part 20 is cylindrical. The outside diameter of the holding part 20 is selected somewhat smaller than the diameter of the fourth bore portion 27, but larger than the diameter of the third bore portion 26. The holding part 20 is provided, on a middle portion of its outer wall, with a radial bore 39, into which a stud 40 can be pressed. The outside diameter of the stud 40 is made somewhat smaller than the diameter of the long hole 37.

The spring 18 is designed as a helical compression spring, the inside diameter of which is larger than the outside diameter of the shank portion 10 and the outside diameter of which is smaller than the diameter of the third bore portion 26.

The assembly and functioning of the time stamp are described below.

First of all, in the rear part 19b of the basic body 19, the holding part 20 is introduced into the fourth bore portion 27, so that one end face of the holding part 20 bears on abutment surface 32. The stud 40 is then fitted through the long hole 37 into the bore 39 of the holding part 20 from outside the basic body 19, so that the stud 40 is connected firmly to the holding part 20. The holding part 20 is thereby mounted axially movably in the fourth bore portion 27 and at the same time is fixed against rotation in the circumferential direction. The spring 18 is introduced into the third bore portion 26 of the front part 19a, so that its one end face bears on the radial step 29. The front part 19a thus prepared and the rear part 19b thus prepared are then plugged together and welded to one another, as already described above.

The length of the spring is fixed so that the holding part 20 is pressed with a predetermined force against abutment surface 32. In this state, the holding part 20 is movable in the axial direction, counter to the pretension of the spring 18, between abutment surfaces 32 and 30. As already mentioned, a rotation of the holding part 20 about its longitudinal axis is prevented as a result of the engagement of the stud 40 into the long hole 37.

The insert 7 is then inserted, with the shank portion 10 in front, into the cylindrical recess 21 from the same side as the annular surface 23 and is screwed into the holding part 20 as a result of a rotational movement. During the operation of screwing in the insert 7, the axial bearing surface 11 of the head portion 8 comes to bear on the axial bearing surface 22 of the basic body 19. The insert has thus reached its desired height position relative to the front end face of the basic body 19. As a result of a further rotation of the insert 7 into the holding part 20, the holding part 20 is raised by the amount of a predetermined axial stroke h, until the other end face of the holding part butts against abutment surface 30. By means of an outward rotational movement of the insert 7 relative to the basic body 19, any settings between the insert 7 and the basic body 19 can be made (see also FIG. 2), a predetermined position between the two components being maintained by the frictional force generated by means of the spring 18 between axial bearing surfaces 11 and 22. The thread 9 of the insert 7 has a pitch of 0.2 to 0.6, the insert 7 itself preferably being screwed between 1 and 5 thread flights into the holding part 20.

During a further outward rotational movement of the insert 7, the holding part 20 is set down again on the abutment surface 32 and the insert 7 moves out of the basic body 19 in the axial direction towards the inner region of the mould and can be extracted.

The time stamp according to the above-described embodiment of the invention is inserted in exactly the same way as described above in the case of the known time stamp into the stepped bore 3 formed inside the mould (see FIG. 3). From outside the mould, the basic body 19 is screwed together with the threaded bore 28 via a threaded bolt 41 (shown in FIG. 3) and retained in the bore 3 formed in the mould.

The advantage of this arrangement is that, in order to exchange the insert of the time stamp installed in the mould, it is necessary to have access to the time stamp solely from the inner region of the mould. The exchange of the insert can take place, without the basic body 19 having to be removed from the mould or without access to the time stamp from outside the mould being necessary.

In the exemplary embodiment described above, the holding part 20 was fixed in terms of rotation relative to the basic body 19 by means of the stud 40 engaged with the long hole 37. However, fixing the holding part 20 and the basic body 19 in terms of relative rotation can also be executed by designing a multi-groove profile between the two components 20 and 19. These and other possible embodiments of the present invention will be readily apparent to those of ordinary skill in the art.

What is claimed is:

1. A time stamp for insertion into a mould for metal working or plastics processing, comprising:
    a basic body for insertion into said mould, said basic body having a moulding surface and having an end face comprising a portion of said moulding surface, said end face having a cylindrical recess therein, the recess having a first axial bearing surface;
    an insert formed as a screw, having a head portion and a shank portion with a second axial bearing surface formed therebetween, for rotatable insertion into the recess; and
    a holding device disposed in the recess for engaging said insert so as to hold said insert in a predetermined circumferential position with respect to said basic body, said holding device having a holding part including a spring which is pretensioned, and wherein the holding part is brought into threaded connection with the shank portion of said insert so that the first bearing surface is pressed against the second bearing surface by the pretensioned spring.

2. A time stamp according to claim 1, wherein the holding part is a rotationally fixed threaded nut which executes an axial stroke movement in the recess.

3. A time stamp according to claim 2, wherein said basic body has a front axial abutment and a rear axial abutment formed therein, and the axial stroke movement is executed between the front axial abutment and the rear axial abutment.

4. A time stamp according to claim 2, wherein said basic body has an axial hole formed therein, and wherein the holding part further comprises a stud fastened to a circumference of the nut, the stud engaging the axial hole and guided therein so as to rotationally fix the nut.

5. A time stamp according to claim 3, wherein said basic body has an axial hole formed therein, and wherein the holding part further comprises a stud fastened to a circumference of the nut, the stud engaging the axial hole and guided therein so as to rotationally fix the nut.

6. A time stamp according to claim 1, wherein said recess has a radial step formed therein and said spring is a compression spring having a first end face and a second end face, the first end face being supported on said holding part and the second end face being supported on the radial step.

7. A time stamp according to claim 1, wherein said recess has a narrowed bore portion formed therein so as to provide said first axial bearing surface.

8. A time stamp according to claim 1, wherein said basic body comprises two connected pieces.

9. A time stamp according to claim 8, wherein said two pieces are welded together.

10. A time stamp according to claim 1, wherein said insert is maintained at a constant height relative to said basic body, so that an end face of the head portion of said insert is flush with the moulding surface of said basic body.

11. A time stamp according to claim 1, wherein said basic body has a cylindrical outer surface, an outside diameter of said basic body being constant.

12. A time stamp according to claim 1, wherein said basic body has a rear end face opposite said end face and a threaded bore formed in the rear end face, and a threaded bolt is arranged on said mould engaging the threaded bore so as to fix said basic body within said mould.

13. A time stamp according to claim 1, wherein the head portion of said insert has an end face having a recess suitable for the engagement of a tool.

14. A time stamp according to claim 13, wherein the recess in the end face of the head portion of said insert comprises an information element of said time stamp.

* * * * *